(12) United States Patent
Zhang et al.

(10) Patent No.: US 12,063,636 B2
(45) Date of Patent: Aug. 13, 2024

(54) METHOD AND DEVICE IN UE AND BASE STATION FOR WIRELESS COMMUNICATION

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/238,538

(22) Filed: Aug. 28, 2023

(65) Prior Publication Data

US 2023/0403686 A1 Dec. 14, 2023

Related U.S. Application Data

(63) Continuation of application No. 17/564,252, filed on Dec. 29, 2021, now Pat. No. 11,864,168, which is a continuation of application No. 16/830,294, filed on Mar. 26, 2020, now Pat. No. 11,252,722, which is a continuation of application No. PCT/CN2019/094665, filed on Jul. 4, 2019.

(30) Foreign Application Priority Data

Jul. 12, 2018 (CN) .......................... 201810763067.9

(51) Int. Cl.
*H04W 72/0446* (2023.01)

(52) U.S. Cl.
CPC .............................. *H04W 72/0446* (2013.01)

(58) Field of Classification Search
CPC .................................................. H04W 72/0446
See application file for complete search history.

(56) References Cited

U.S. PATENT DOCUMENTS

2016/0099799 A1  4/2016  Bashar et al.

FOREIGN PATENT DOCUMENTS

| CN | 102308636 A | 1/2012 |
| CN | 102356568 A | 2/2012 |

(Continued)

OTHER PUBLICATIONS

First Office Action received in application No. CN201810763067.9 dated Jul. 1, 2020.

(Continued)

*Primary Examiner* — Melvin C Marcelo

(57) ABSTRACT

The disclosure provides a method and a device in a User Equipment (UE) and a base station for wireless communication. The UE receives a first signaling, receives a first radio signal in a first time window, and then transmits a feedback on the first radio signal in a second time window. The first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer.

20 Claims, 11 Drawing Sheets

(56) References Cited

FOREIGN PATENT DOCUMENTS

| CN | 102696271 | A  | 9/2012  |
|----|-----------|----|---------|
| CN | 103427954 | A  | 12/2013 |
| CN | 107580801 | A  | 1/2018  |
| CN | 107634821 | A  | 1/2018  |
| CN | 107645777 | A  | 1/2018  |
| CN | 107919948 | A  | 4/2018  |
| CN | 107926020 | A  | 4/2018  |
| CN | 108271262 | A  | 7/2018  |
| EP | 2742627   | A1 | 6/2014  |
| EP | 2849485   | A1 | 3/2015  |
| EP | 3301850   | A1 | 8/2017  |

OTHER PUBLICATIONS

First Search Report received in application No. CN201810763067.9dated Jun. 20, 2020.

CN2201810763067.9Notification to Grant Patent Right for Invention dated Aug. 27, 2020.

ISR received in application No. PCT/CN2019/094665 dated Sep. 25, 2019.

Nokia et al."Uplink HARQ-ACK feedback in efeMTC" 3GPP TSG-RAN WG1 Meeting #92 Feb. 16, 2018.

Nokia et al."Uplink HARQ-ACK feedback in efeMTC" 3GPP TSG-RAN WG1 Meeting #91 Nov. 1, 2017.

NTT Docomo, Inc."Processing time and HARQ process number for NR" 3GPP TSG RAN WG1 Meeting #88 R1-1702816 Feb. 7, 2017.

First Search Report of Chinses patent application No. CN202010890322.3 dated Jan. 29, 2022.

Notification to Grant Patent Right for Invention of Chinses patent application No. CN202010890322.3 dated Feb. 9, 2022.

3GPP tsg_ran\WG1 RL1 "R1-1807391 7.6.4.3 Enhancements to Scheduling and HARQ Operation for NR-U" May 12, 2018.

Search Report of CN202010890323.8, dated Mar. 18, 2024.

Notice of grant of patent right for invention of CN202010890323.8, dated Apr. 3, 2024.

METHOD AND DEVICE IN UE AND BASE STATION FOR WIRELESS COMMUNICATION

CROSS-REFERENCE TO RELATED APPLICATION

This application is a continuation of the U.S. patent application Ser. No. 17/564,252, filed on Dec. 29, 2021, which is a continuation of the U.S. patent application Ser. No. 16/830,294, filed on Mar. 26, 2020, which is a continuation of the International Application No. PCT/CN2019/094665, filed on Jul. 4, 2019, claiming the priority benefit of Chinese Application No. 201810763067.9, filed on Jul. 12, 2018, the full disclosure of which is incorporated herein by reference.

BACKGROUND

Technical Field

The disclosure relates to transmission methods and devices in wireless communication systems, and in particular to a communication method and device supporting data transmission over unlicensed spectrum.

Related Art

In 5G systems, Enhance Mobile Broadband (eMBB) and Ultra Reliable and Low Latency Communication (URLLC) are two typical service types. A new Modulation and Coding Scheme (MCS) table has been defined for URLLC services in the 3rd Generation Partner Project (3GPP) New Radio (NR) Release 15.

In order to support URLLC services of higher requirements, for example, higher reliability, lower latency (0.5-1 ms), etc., the 3GPP Radio Access Network (RAN) #80 session had approved a Study Item (SI) of URLLC enhancement of NR Release 16, in which enhancements to scheduling/Hybrid Automatic Repeat reQuest (HARQ)/Channel State Information (CSI) timeline are a key point to be studied.

SUMMARY

The inventor finds through researches that applications having low-latency requirements need to feed back a HARQ/CSI quickly while applications having no low-latency requirements may feedback a HARQ/SCI slowly; therefore, how to configure a HARQ/SCI feedback in view of different latency requirements is a key problem to be solved.

In view of the above problems, the disclosure provides a solution. It should be noted that embodiments of the disclosure and characteristics of the embodiments may be mutually combined arbitrarily.

The disclosure provides a method in a User Equipment (UE) for wireless communication, wherein the method includes:
 receiving a first signaling;
 receiving a first radio signal in a first time window; and
 transmitting a feedback on the first radio signal in a second time window.

Herein, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the problem to be solved by the disclosure is: how to enhance the scheme of configuration of Hybrid Automatic Repeat reQuest ACKnowledgement (HARQ-ACK) feedback latency in view of the lower-latency requirements in NR Release 16.

In one embodiment, the problem to be solved by the disclosure is as follows: in NR Release 15, the configuration of HARQ-ACK feedback latency may be indicated through Downlink Control Information (DCI) (PDSCH (Physical Downlink Shared CHannel)-to-HARQ_feedback timing indicator field in DCI format 1_0 or 1_1) or configured by Radio Resource Control (RRC) (when the PDSCH-to-HARQ_feedback timing indicator field is a 0 bit in DCI format 1_1). The method of indication through a DCI is to select one latency value from one HARQ-ACK feedback latency range configured by an RRC, while the method of configuration through an RRC is that the RRC configures one HARQ-ACK feedback latency. To support a HARQ feedback with a lower latency in NR Release 16, how to enhance the above method of DCI indication or the above method of RRC configuration is a key problem to be solved.

In one embodiment, the essence of the above method is that: the first signaling is a DCI signaling for scheduling a PDSCH, the first radio signal is a PDSCH scheduled by the first signaling, the feedback on the first radio signal is a HARQ-ACK, the first time window is a slot in which the PDSCH is located, the second time window is a slot in which the HARQ-ACK is located, the first time-domain deviation is a feedback latency of the HARQ-ACK relative to the PDSCH, and the first identifier and the second identifier are two different Radio Network Temporary Identifiers (RNTIs) used for CRC scrambling of the DCI. If detected that the DCI is scrambled with the first identifier, the feedback latency of the HARQ-ACK relative to the PDSCH belongs to the K1 first-type candidate deviation(s); if detected that the DCI is scrambled with the second identifier, the feedback latency of the HARQ-ACK relative to the PDSCH belongs to the K2 first-type candidate deviation(s). The adoption of the above method has the following benefits: the RNTI used for scrambling the CRC of the DCI is associated to a HARQ-ACK feedback latency range, thus the HARQ-ACK feedback latency range may be determined implicitly by identifying the RNTI; on one hand, for the case of selecting one latency value from the HARQ-ACK feedback latency range through the DCI signaling, the above method avoids the case that more bit overheads are introduced into the DCI to support a lower latency; on the other hand, for the case of indicating the HARQ-ACK feedback latency through the RRC signaling, multiple HARQ-ACK feedback latency ranges associated to the RNTI are configured, which solves the problem that different services have different requirements on latency.

According to one aspect of the disclosure, the above method is characterized in that: at least one of the K2 second-type candidate deviation(s) is less than each of the K1 first-type candidate deviation(s).

According to one aspect of the disclosure, the essence of the above method is that: the K1 first-type candidate deviation(s) is(are) used for applications in NR Release 15, while the K2 second-type candidate deviation(s) is(are) used for applications with lower-latency requirements in NR Release 16.

According to one aspect of the disclosure, the above method is characterized in that: the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, the first field included in the first information is used for determining the first time-domain deviation from the K1 first-type candidate deviations or the K2 second-type candidate deviations.

According to one aspect of the disclosure, the above method is characterized in that: the first signaling is used for determining time-frequency resources occupied by the feedback on the first radio signal in the second time window.

According to one aspect of the disclosure, the above method includes:
receiving second information.
Herein, the second information is used for indicating at least one of the K1 first-type candidate deviation(s) and the K2 second-type candidate deviation(s).

According to one aspect of the disclosure, the above method includes:
receiving third information.
Herein, the third information is used for indicating the second identifier.

The disclosure provides a method in a base station for wireless communication, wherein the method includes:
transmitting a first signaling;
transmitting a first radio signal in a first time window; and
receiving a feedback on the first radio signal in a second time window.

Herein, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

According to one aspect of the disclosure, the above method is characterized in that: at least one of the K2 second-type candidate deviation(s) is less than each of the K1 first-type candidate deviation(s).

According to one aspect of the disclosure, the above method is characterized in that: the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, the first field included in the first information is used for determining the first time-domain deviation from the K1 first-type candidate deviations or the K2 second-type candidate deviations.

According to one aspect of the disclosure, the above method is characterized in that: the first signaling is used for determining time-frequency resources occupied by the feedback on the first radio signal in the second time window.

According to one aspect of the disclosure, the above method includes:
transmitting second information.
Herein, the second information is used for indicating at least one of the K1 first-type candidate deviation(s) and the K2 second-type candidate deviation(s).

According to one aspect of the disclosure, the above method includes:
transmitting third information.
Herein, the third information is used for indicating the second identifier.

The disclosure provides a UE for wireless communication, wherein the UE includes:
a first receiver, to receive a first signaling, and to receive a first radio signal in a first time window; and
a first transmitter, to transmit a feedback on the first radio signal in a second time window.

Herein, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the above UE is characterized in that: at least one of the K2 second-type candidate deviation(s) is less than each of the K1 first-type candidate deviation(s).

In one embodiment, the above UE is characterized in that: the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, the first field included in the first information is used for determining the first time-domain deviation from the K1 first-type candidate deviations or the K2 second-type candidate deviations.

In one embodiment, the above UE is characterized in that: the first signaling is used for determining time-frequency resources occupied by the feedback on the first radio signal in the second time window.

In one embodiment, the above UE is characterized in that: the first receiver further receives second information; wherein the second information is used for indicating at least one of the K1 first-type candidate deviation(s) and the K2 second-type candidate deviation(s).

In one embodiment, the above UE is characterized in that: the first receiver further receives third information; wherein the third information is used for indicating the second identifier.

The disclosure provides a base station for wireless communication, wherein the base station includes:
a second transmitter, to transmit a first signaling, and to transmit a first radio signal in a first time window; and
a second receiver, to receive a feedback on the first radio signal in a second time window.

Herein, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the above UE is characterized in that: at least one of the K2 second-type candidate deviation(s) is less than each of the K1 first-type candidate deviation(s).

In one embodiment, the above UE is characterized in that: the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, the first field included in the first information is used for determining the first time-domain deviation from the K1 first-type candidate deviations or the K2 second-type candidate deviations.

In one embodiment, the above UE is characterized in that: the first signaling is used for determining time-frequency resources occupied by the feedback on the first radio signal in the second time window.

In one embodiment, the above UE is characterized in that: the second transmitter further transmits second information; wherein the second information is used for indicating at least one of the K1 first-type candidate deviation(s) and the K2 second-type candidate deviation(s).

In one embodiment, the above UE is characterized in that: the second transmitter further transmits third information; wherein the third information is used for indicating the second identifier.

In one embodiment, compared with conventional schemes, the disclosure has the following advantages.

In NR Release 15, the configuration of HARQ-ACK feedback latency may be indicated through a DCI (the PDSCH-to-HARQ_feedback timing indicator field in DCI format 1_0 or 1_1) or configured by an RRC (when the PDSCH-to-HARQ_feedback timing indicator field is a 0 bit in DCI format 1_1). The method of indication through a DCI is to select one latency value from one HARQ-ACK feedback latency range configured by an RRC, while the method of configuration through an RRC is that the RRC configures one HARQ-ACK feedback latency. The disclosure can support different latency requirements for the HARQ feedback in NR Release 15 and future Release 16 simultaneously.

The RNTI used for scrambling the CRC of the DCI is associated to a HARQ-ACK feedback latency range, thus the HARQ-ACK feedback latency range may be determined implicitly by identifying the RNTI.

For the case of selecting one latency value from the HARQ-ACK feedback latency range through the DCI signaling, the disclosure avoids the case that more bit overheads are introduced into the DCI to support a lower latency.

For the case of indicating the HARQ-ACK feedback latency through the RRC signaling, the disclosure configures multiple HARQ-ACK feedback latency ranges associated to the RNTI, which solves the problem that different services have different requirements on latency.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
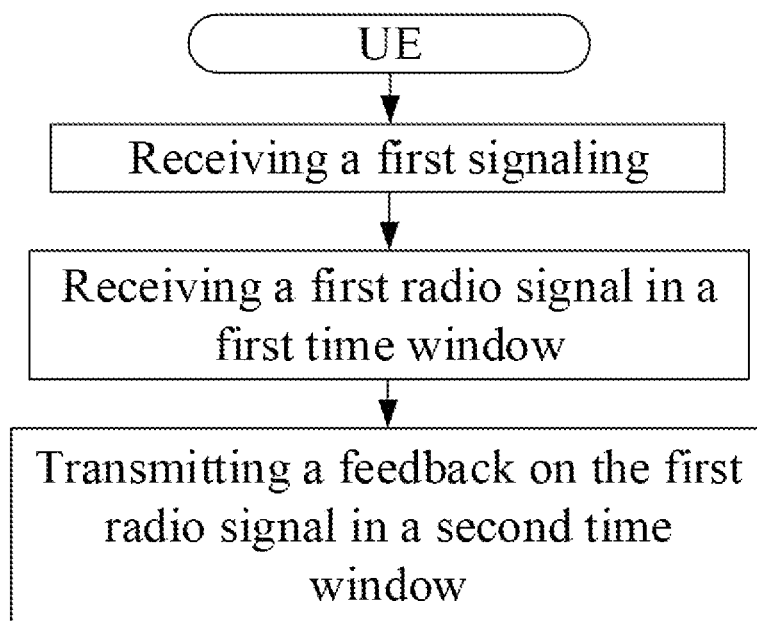
FIG. 1 is a flowchart of a first signaling, a first radio signal and a feedback on the first radio signal according to one embodiment of the disclosure.

Embodiment 1 illustrates an example of a flowchart of a first signaling, a first radio signal and a feedback on the first radio signal, as shown in FIG. 1.

In Embodiment 1, the UE in the disclosure receives a first signaling, receives a first radio signal in a first time window, and transmits a feedback on the first radio signal in a second time window; wherein the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the first signaling is dynamically configured.

In one embodiment, the first signaling is a physical layer signaling.

In one embodiment, the first signaling is a DCI signaling.

In one embodiment, the first signaling is a DCI signaling of downlink grant.

In one embodiment, the first signaling is a DCI signaling of uplink grant.

In one embodiment, the first signaling is transmitted on a downlink physical layer control channel (that is, a downlink channel capable of carrying physical layer signalings only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first signaling is transmitted on a downlink physical layer data channel (that is, a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the first signaling is a UE-specific DCI signaling.

In one embodiment, the first signaling is a UE specific.

In one embodiment, the first identifier and the second identifier are two different signaling identifiers respectively.

In one embodiment, the first identifier and the second identifier are two different RNTIs respectively.

In one embodiment, the first identifier includes a cell-RNTI or a Configured Scheduling (CS)-RNTI, the second identifier includes a new-RNTI, and specific definitions of the new-RNTI can refer to Chapter 5.1.3.1 in 3GPP TS38.214.

In one embodiment, the first identifier includes one of multiple RNTIs, and the second identifier includes one of the multiple RNTIs different from the first identifier.

In one subembodiment, the multiple RNTIs include at least two of a C-RNTI, a CS-RNTI and a new-RNTI, and specific definitions of the new-RNTI can refer to Chapter 5.1.3.1 in 3GPP TS38.214.

In one embodiment, the first identifier and the second identifier are two different non-negative integers respectively.

In one embodiment, the first identifier or the second identifier is a signaling identifier of the first signaling.

In one embodiment, the first signaling is a DCI signaling identified by the first identifier or the second identifier.

In one embodiment, the first identifier or the second identifier is used for generating a Reference Signal (RS) sequence of a Demodulation Reference Signal (DMRS) of the first signaling.

In one embodiment, a Cyclic Redundancy Check (CRC) bit sequence of the first signaling is scrambled by the first identifier or the second identifier.

In one embodiment, the first signaling carries first information, the first information includes a second field, the second field included in the first information includes a positive integer number of bits, and the second field included in the first information is used for indicating a Modulation and Coding Scheme (MCS) of the first radio signal.

In one subembodiment, the second field included in the first information indicates explicitly the MCS of the first radio signal.

In one subembodiment, the second field included in the first information indicates implicitly the MCS of the first radio signal.

In one embodiment, when the first signaling carries the first identifier, the MCS of the first radio signal belongs to one of a first MCS set, a second MCS set and a third MCS set; when the first signaling carries the second identifier, the MCS of the first radio signal belongs to a third MCS set; the first MCS set includes a positive integer number of MCSs, the second MCS set includes a positive integer number of MCSs, and the third MCS set includes a positive integer number of MCSs.

In one subembodiment, the first MCS set, the second MCS set and the third MCS set are different from each other.

In one subembodiment, a code rate of at least one MCS in the third MCS set is lower than a code rate of each MCS in the first MCS set or in the second MCS set.

In one subembodiment, a code rate of at least one MCS in the third MCS set is lower than a code rate of each MCS in the first MCS set and in the second MCS set.

In one subembodiment, at least one MCS in the first MCS set does not belong to the second MCS set, or at least one MCS in the second MCS set does not belong to the first MCS set.

In one subembodiment, at least one MCS in the first MCS set does not belong to the third MCS set, or at least one MCS in the third MCS set does not belong to the first MCS set.

In one subembodiment, at least one MCS in the second MCS set does not belong to the third MCS set, or at least one MCS in the third MCS set does not belong to the second MCS set.

In one subembodiment, specific definitions of the first MCS set can refer to Table in Chapter 5.1.3.1 in 3GPP TS38.214.

In one subembodiment, specific definitions of the second MCS set can refer to Table in Chapter 5.1.3.1 in 3GPP TS38.214.

In one subembodiment, specific definitions of the third MCS set can refer to Table in Chapter 5.1.3.1 in 3GPP TS38.214.

In one embodiment, the first information belongs to a DCI.

In one embodiment, the first signaling is a DCI signaling of downlink grant, and the first information belongs to a DCI of downlink grant.

In one embodiment, the first signaling is a DCI signaling of uplink grant, and the first information belongs to a DCI of uplink grant.

In one embodiment, the first information includes one DCI.

In one embodiment, the first signaling is a DCI signaling of downlink grant, and the first information includes one DCI of downlink grant.

In one embodiment, the first signaling is a DCI signaling of uplink grant, and the first information includes one DCI of uplink grant.

In one embodiment, the first information includes a positive integer number of fields in one DCI, and the field includes a positive integer number of bits.

In one embodiment, the first time window includes a positive integer number of time-domain resource units.

In one embodiment, the first time window includes one time-domain resource unit.

In one embodiment, the first time window includes a positive integer number of consecutive multicarrier symbols.

In one embodiment, the first time window is a continuous period of time.

In one embodiment, a duration of the first time window is predefined.

In one embodiment, a duration of the first time window is configurable.

In one embodiment, a duration of the first time window is configured by a higher-layer signaling.

In one embodiment, a duration of the first time window is configured by a physical-layer signaling.

In one embodiment, the second time window includes a positive integer number of time-domain resource units.

In one embodiment, the second time window includes one time-domain resource unit.

In one embodiment, the second time window includes a positive integer number of consecutive multicarrier symbols.

In one embodiment, the second time window is a continuous period of time.

In one embodiment, a duration of the second time window is predefined.

In one embodiment, a duration of the second time window is configurable.

In one embodiment, a duration of the second time window is configured by a higher-layer signaling.

In one embodiment, a duration of the second time window is configured by a physical-layer signaling.

In one embodiment, the first time window includes one or more time-domain resource units to which the time-domain resources occupied by the first radio signal belong.

In one embodiment, the second time window includes one or more time-domain resource units to which the time-domain resources occupied by the feedback on the first radio signal belong.

In one embodiment, the first time window includes one time-domain resource unit to which the time-domain resources occupied by the first radio signal belong.

In one embodiment, the second time window includes one time-domain resource unit to which the time-domain resources occupied by the feedback on the first radio signal belong.

In one embodiment, the time-domain resource unit includes a positive integer number of consecutive multicarrier symbols.

In one embodiment, the time-domain resource unit includes one subframe.

In one embodiment, the time-domain resource unit includes one slot.

In one embodiment, the time-domain resource unit includes one min-slot.

In one embodiment, the time-domain resource unit includes a positive integer number of sub frames.

In one embodiment, the time-domain resource unit includes a positive integer number of slots.

In one embodiment, the time-domain resource unit includes a positive integer number of mini-slots.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol includes a Cyclic Prefix (CP).

In one embodiment, the first time-domain deviation is a deviation in time domain between a start time of the second time window and a start time of the first time window.

In one embodiment, the first time-domain deviation is a deviation in time domain between an end time of the second time window and an end time of the first time window.

In one embodiment, a first reference time is a time in the first time window, a second reference time is a time in the second time window, and the first time-domain deviation is a deviation in time domain between the second reference time and the first reference time.

In one subembodiment, the first reference time is a start time of the first time window.

In one subembodiment, the first reference time is an end time of the first time window.

In one subembodiment, the first reference time is a time in the first time window other than the start time and the end time.

In one subembodiment, the second reference time is a start time of the second time window.

In one subembodiment, the second reference time is an end time of the second time window.

In one subembodiment, the second reference time is a time in the second time window other than the start time and the end time.

In one embodiment, the first time window includes one time-domain resource unit to which the time-domain resources occupied by the first radio signal belong, the second time window includes one time-domain resource unit to which the time-domain resources occupied by the feedback on the first radio signal belong, and the first time-domain deviation is a deviation between an index of the time-domain resource unit included in the second time window and an index of the time-domain resource unit included in the first time window.

In one embodiment, the unit of the first time-domain deviation is a time-domain resource unit.

In one embodiment, the unit of the first time-domain deviation is a multicarrier symbol.

In one embodiment, the unit of the first time-domain deviation is a second.

In one embodiment, the unit of the first time-domain deviation is a millisecond.

In one embodiment, the first time-domain deviation is a non-negative real number.

In one embodiment, the first time-domain deviation is a non-negative integer.

In one embodiment, the first radio signal includes data, and the feedback on the first radio signal includes a HARQ-ACK.

In one subembodiment, the data included in the first radio signal is downlink data.

In one embodiment, a transport channel of the first radio signal is a Downlink Shared Channel (DL-SCH).

In one embodiment, the first radio signal is transmitted on a downlink physical layer data channel (that is, a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, a transport channel of the feedback on the first radio signal is a resource of an uplink physical layer control channel (that is, an uplink channel capable of carrying physical layer signalings only).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, a transport channel of the feedback on the first radio signal is an Uplink Shared Channel (UL-SCH).

In one embodiment, a transport channel of the feedback on the first radio signal is transmitted on an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, the first signaling is used for indicating scheduling information of the first radio signal, and the first signaling is used for determining time-domain resources occupied by the first radio signal.

In one subembodiment, the first signaling indicates explicitly the scheduling information of the first radio signal.

In one subembodiment, the first signaling indicates implicitly the scheduling information of the first radio signal.

In one subembodiment, the first signaling indicates explicitly the time-domain resources occupied by the first radio signal.

In one subembodiment, the first signaling indicates implicitly the time-domain resources occupied by the first radio signal.

Embodiment 2

Figure 2:
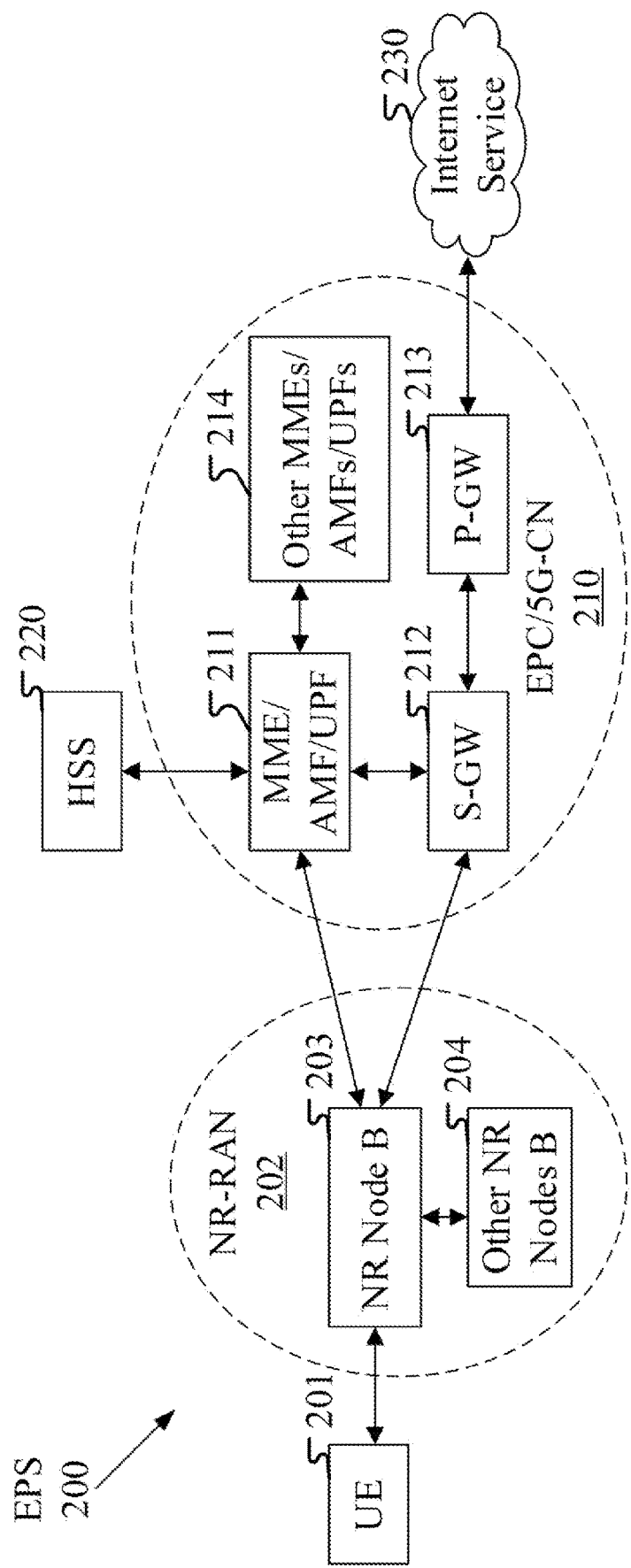
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and Streaming Services (PSSs).

In one embodiment, the UE 201 corresponds to the UE in the disclosure.

In one embodiment, the gNB 203 corresponds to the base station in the disclosure.

In one embodiment, the UE 201 supports massive MIMO wireless communications.

In one embodiment, the gNB 203 supports massive MIMO wireless communications.

Embodiment 3

Figure 3:
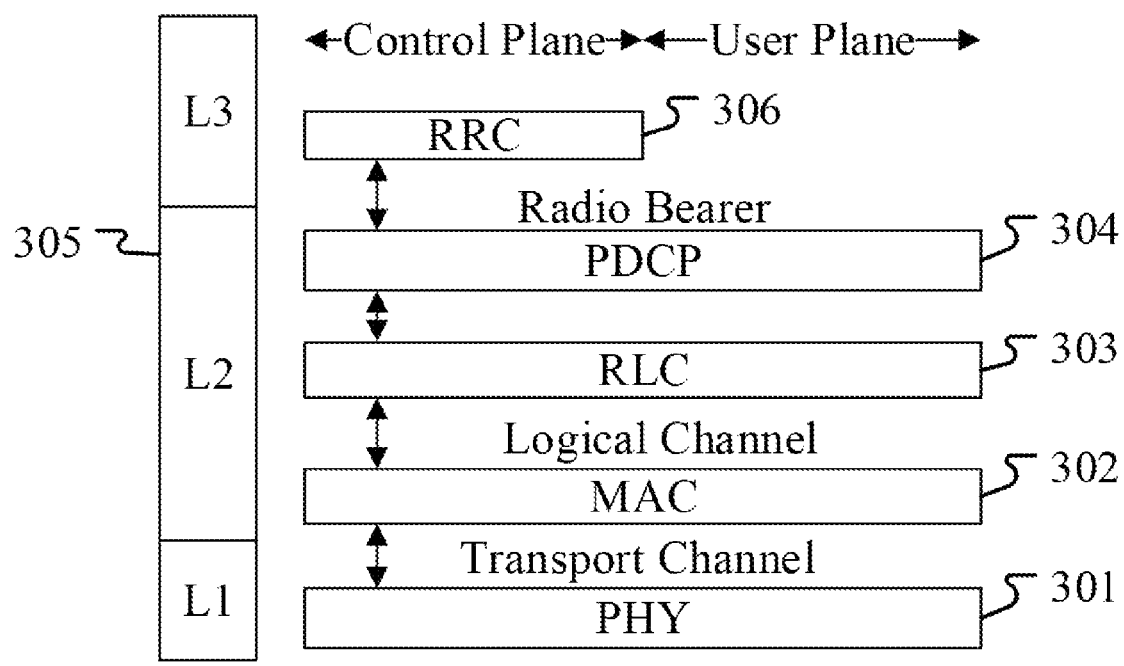
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the eNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the eNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between eNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the eNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the eNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first signaling in the disclosure is generated by the PHY 301.

In one embodiment, the second information in the disclosure is generated by the RRC sublayer 306.

In one embodiment, the third information in the disclosure is generated by the RRC sublayer 306.

In one embodiment, the fourth information in the disclosure is generated by the RRC sublayer 306.

In one embodiment, the first radio signal in the disclosure is generated by the PHY 301.

In one embodiment, the feedback on the first radio signal in the disclosure is generated by the PHY 301.

Embodiment 4

Figure 4:
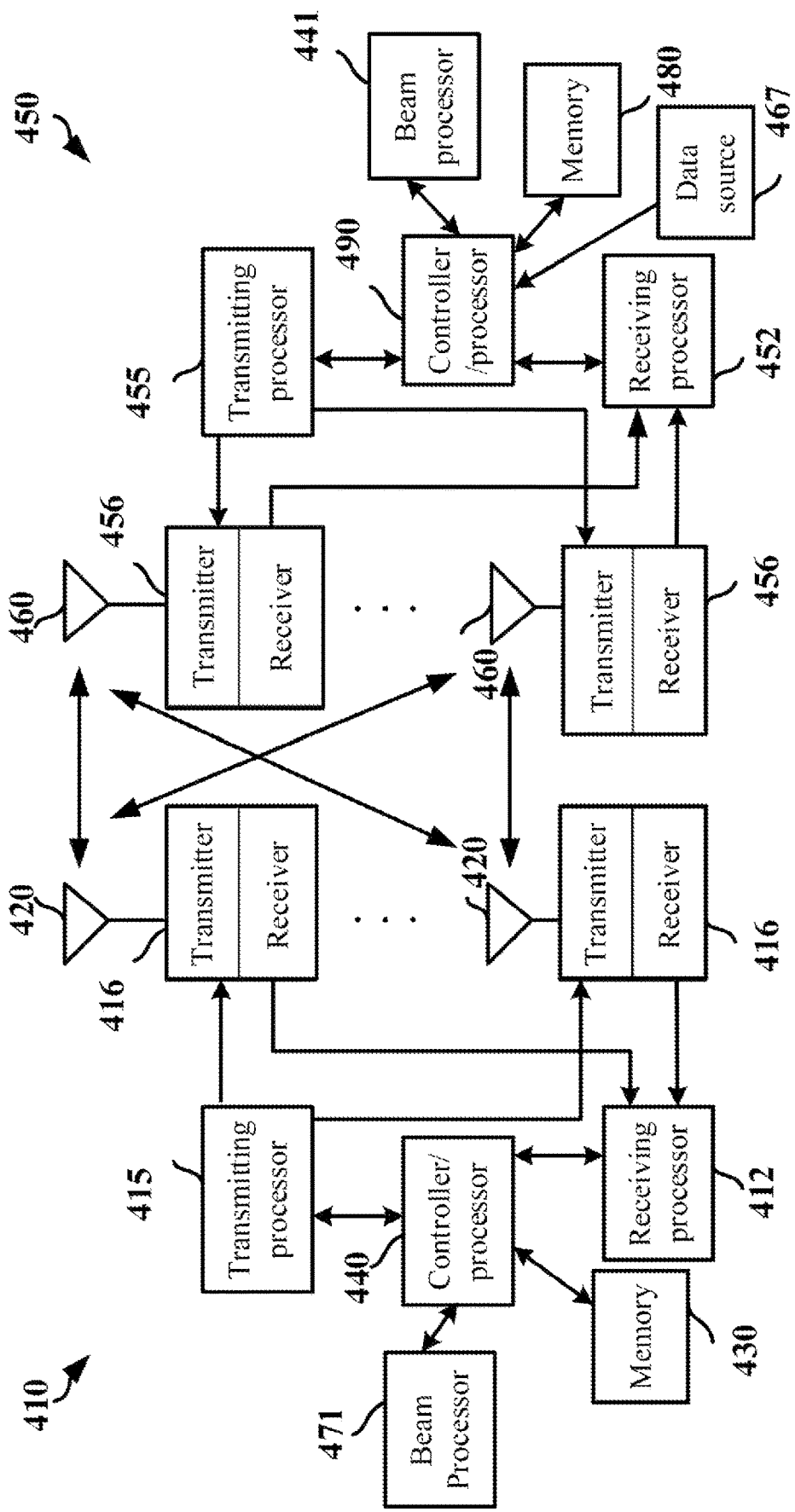
FIG. 4 is a diagram illustrating a NR node and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a beam processor 471, a transmitting processor 415, a transmitter/receiver 416 and an antenna 420.

The UE 450 includes a controller/processor 490, a memory 480, a data source 467, a beam processor 441, a transmitting processor 455, a receiving processor 452, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduler 443 for a transmission requirement, and the scheduler 443 is configured to schedule an aerial resource corresponding to the transmission requirement.

The beam processor 471 determines a first signaling and a first radio signal.

The transmitting processor 415 receives a bit stream output from the controller/processor 440, and performs various signal transmitting processing functions of an L1 layer (that is, PHY), including encoding, interleaving, scrambling, modulation, power control/allocation, generation of physical layer control signaling s (including PBCH, PDCCH, PHICH, PCFICH, reference signal), etc.

The transmitting processor 415 receives a bit stream output from the controller/processor 440, and performs various signal transmitting processing functions of an L1 layer (that is, PHY), including multi-antenna transmission, spreading, code division multiplexing, precoding, etc.

The transmitter 416 is configured to convert a baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions of an L1 layer (that is, PHY), including decoding, de-interleaving, descrambling, demodulation, extraction of physical layer control signalings, etc.

The receiving processor 452 performs various signal receiving processing functions of an L1 layer (that is, PHY), including multi-antenna receiving, despreading, code division multiplexing, precoding, etc.

The beam processor 441 determines a first signaling and a first radio signal.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In Uplink (UL) transmission, processes relevant to the base station device 410 include the following.

The receiver 416 receives a radio-frequency signal through the corresponding antenna 420, converts the received radio-frequency signal into a baseband signal, and provides the baseband signal to the receiving processor 412.

The receiving processor 412 performs various signal receiving processing functions of an L1 layer (that is, PHY), including decoding, de-interleaving, descrambling, demodulation, extraction of physical layer control signalings, etc.

The receiving processor 412 performs various signal receiving processing functions of an L1 layer (that is, PHY), including multi-antenna receiving, despreading, code division multiplexing, precoding, etc.

The controller/processor 440 performs operations of an L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

The beam processor 471 determines a feedback on the first radio signal.

In UL transmission, processes relevant to the UE 450 include the following.

The data source 467 provides a higher-layer packet to the controller/processor 490. The data source 467 illustrates all protocol layers above the L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of the L1 layer (that is, PHY), including encoding, interleaving, scrambling, modulation, generation of physical layer signalings, etc.

The transmitting processor 455 performs various signal transmitting processing functions of the L1 layer (that is, PHY), including multi-antenna transmission, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of the layer 2 of the user plane and the control plane.

The controller/processor 490 is also in charge of HARQ operation, retransmission of a lost packet, and the signaling to the eNB 410.

The beam processor 441 determines a feedback on the first radio signal.

In one embodiment, the UE 450 includes at least one processor and at least one memory. The at least one memory includes computer program codes. The at least one memory and the computer program codes are configured to be used in collaboration with the at least one processor. The UE 450 at least receives a first signaling, receives a first radio signal in a first time window, and transmits a feedback on the first radio signal in a second time window; wherein the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the UE 450 includes a memory that stores a computer readable instruction program. The computer readable instruction program generates an action when executed by at least one processor. The action includes receiving a first signaling, receiving a first radio signal in a first time window, and transmitting a feedback on the first radio signal in a second time window; wherein the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the gNB 410 includes at least one processor and at least one memory. The at least one memory includes computer program codes. The at least one memory and the computer program codes are configured to be used in collaboration with the at least one processor. The gNB 410 at least transmits a first signaling, transmits a first radio signal in a first time window, and receives a feedback on the first radio signal in a second time window; wherein the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the gNB 410 includes a memory that stores a computer readable instruction program. The computer readable instruction program generates an action when executed by at least one processor. The action includes transmitting a first signaling, transmitting a first radio signal in a first time window, and receiving a feedback on the first radio signal in a second time window; wherein the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, the UE 450 corresponds to the UE in the disclosure.

In one embodiment, the gNB 410 corresponds to the base station in the disclosure.

In one embodiment, at least the former two of the receiver 456, the receiving processor 452 and the controller/processor 490 are used for receiving the first signaling in the disclosure.

In one embodiment, at least the former two of the transmitter 416, the transmitting processor 415 and the controller/processor 440 are used for transmitting the first signaling in the disclosure.

In one embodiment, at least the former two of the receiver 456, the receiving processor 452 and the controller/processor 490 are used for receiving the second information in the disclosure.

In one embodiment, at least the former two of the transmitter 416, the transmitting processor 415 and the controller/processor 440 are used for transmitting the second information in the disclosure.

In one embodiment, at least the former two of the receiver 456, the receiving processor 452 and the controller/processor 490 are used for receiving the third information in the disclosure.

In one embodiment, at least the former two of the transmitter 416, the transmitting processor 415 and the controller/processor 440 are used for transmitting the third information in the disclosure.

In one embodiment, at least the former two of the receiver 456, the receiving processor 452 and the controller/processor 490 are used for receiving the fourth information in the disclosure.

In one embodiment, at least the former two of the transmitter 416, the transmitting processor 415 and the controller/processor 440 are used for transmitting the fourth information in the disclosure.

In one embodiment, at least the former two of the receiver 456, the receiving processor 452 and the controller/processor 490 are used for receiving the first radio signal in the disclosure in the first time window in the disclosure.

In one embodiment, at least the former two of the transmitter 416, the transmitting processor 415 and the controller/processor 440 are used for transmitting the first radio signal in the disclosure in the first time window in the disclosure.

In one embodiment, at least the former two of the transmitter 456, the transmitting processor 455 and the controller/processor 490 are used for transmitting the feedback on the first radio signal in the disclosure in the second time window in the disclosure.

In one embodiment, at least the former two of the receiver 416, the receiving processor 412 and the controller/processor 440 are used for receiving the feedback on the first radio signal in the disclosure in the second time window in the disclosure.

Embodiment 5

Figure 5:
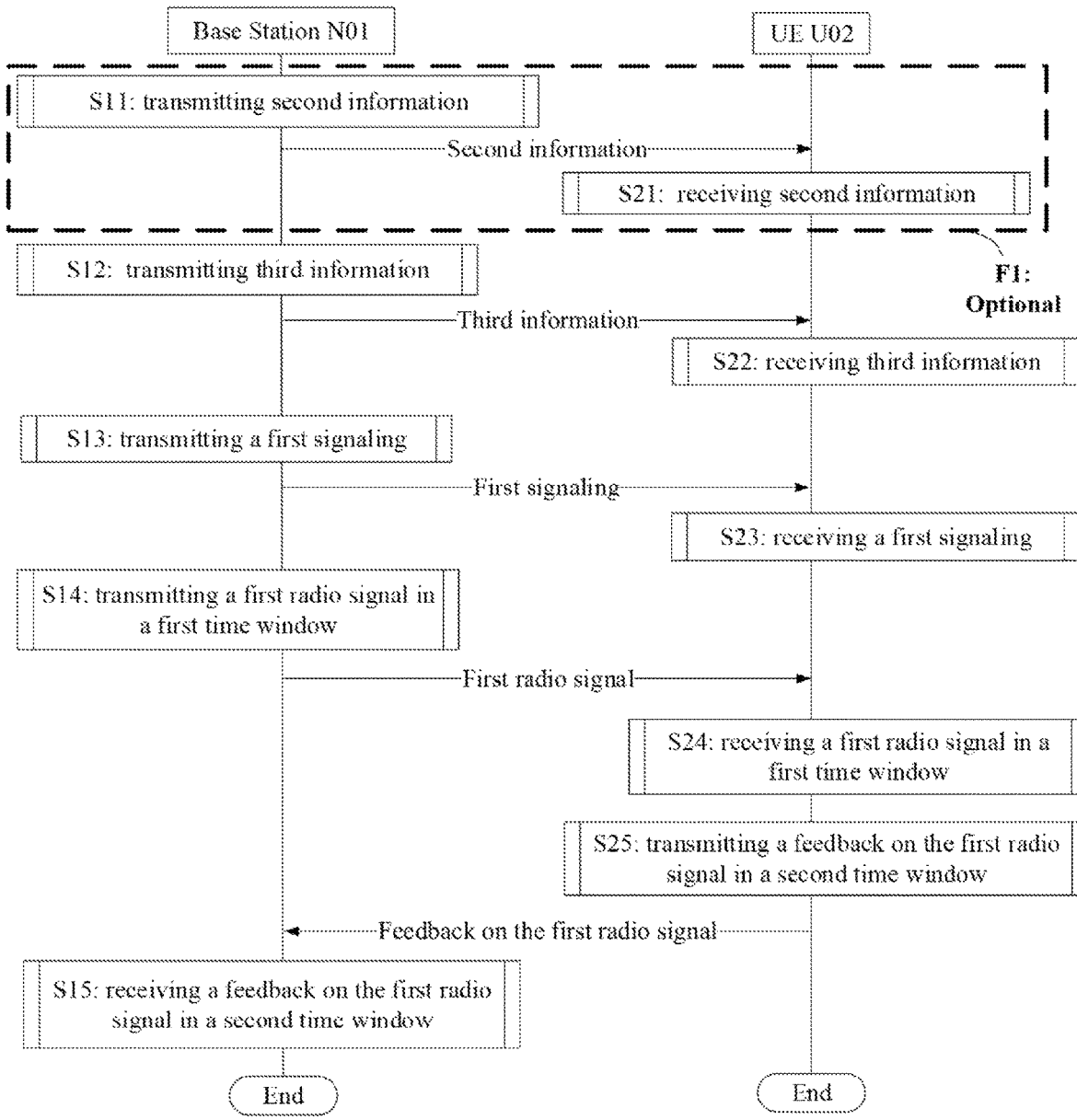
FIG. 5 is a flowchart of wireless transmission according to one embodiment of the disclosure.

Embodiment 5 illustrates an example of a flowchart of wireless transmission, as shown in FIG. 5. In FIG. 5, a base station N01 is a maintenance base station for a serving cell of a UE U02. In FIG. 5, boxes F1 and F2 are optional.

The N01 transmits second information in S11, transmits third information in S12, transmits a first signaling in S13, transmits a first radio signal in a first time window in S14, and receives a feedback on the first radio signal in a second time window in S15.

The U02 receives second information in S21, receives third information in S22, receives a first signaling in S23, receives a first radio signal in a first time window in S24, and transmits a feedback on the first radio signal in a second time window in S25.

In Embodiment 5, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s). The second information is used for indicating at least one of the K1 first-type candidate deviation(s) and the K2 second-type candidate deviation(s). The third information is used for indicating the second identifier.

In one embodiment, at least one of the K2 second-type candidate deviation(s) is less than each of the K1 first-type candidate deviation(s).

In one embodiment, the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, the first field included in the first information is used for determining the first time-domain deviation from the K1 first-type candidate deviations or the K2 second-type candidate deviations.

In one embodiment, the first signaling is used for determining time-frequency resources occupied by the feedback on the first radio signal in the second time window.

In one embodiment, the second information is semi-statically configured.

In one embodiment, the second information is carried by a higher-layer signaling.

In one embodiment, the second information is carried by an RRC signaling.

In one embodiment, the second information includes one or more IEs in one RRC signaling.

In one embodiment, the second information includes a part or entirety of one IE in one RRC signaling.

In one embodiment, the second information includes more IEs in one RRC signaling.

In one embodiment, the second information is used for indicating the K1 first-type candidate deviation(s).

In one subembodiment, the second information is dl-DataToUL-ACK, and specific definitions of the dl-DataToUL-ACK can refer to Chapter 9.2.3 in 3GPP TS38.213.

In one embodiment, the second information is used for indicating the K2 second-type candidate deviation(s).

In one embodiment, the second information is used for indicating the K1 first-type candidate deviation(s) and the K2 second-type candidate deviation(s).

In one embodiment, the third information is semi-statically configured.

In one embodiment, the third information is carried by a higher-layer signaling.

In one embodiment, the third information is carried by an RRC signaling.

In one embodiment, the third information includes one or more IEs in one RRC signaling.

In one embodiment, the third information includes a part or entirety of one IE in one RRC signaling.

In one embodiment, the third information includes more IEs in one RRC signaling.

In one embodiment, the third information indicates explicitly the second identifier.

In one embodiment, the third information indicates implicitly the second identifier.

In one embodiment, the third information is used for indicating the first identifier and the second identifier.

In one embodiment, the third information indicates explicitly the first identifier and the second identifier.

In one embodiment, the third information indicates implicitly the first identifier and the second identifier.

Embodiment 6

Figure 6:
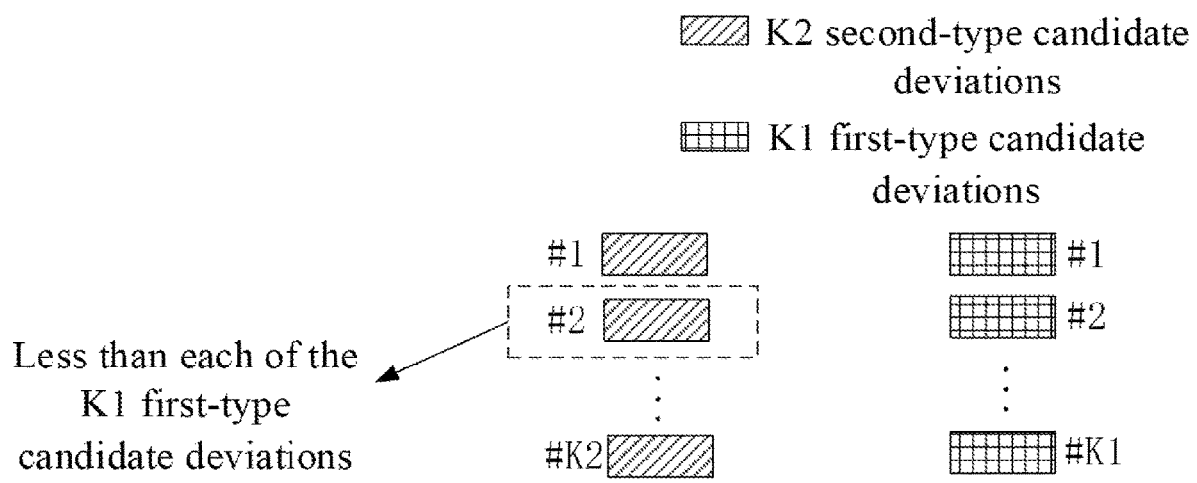
FIG. 6 is diagram illustrating K1 first-type candidate deviations and K2 second-type candidate deviations according to one embodiment of the disclosure.

Embodiment 6 illustrates an example of a diagram of K1 first-type candidate deviations and the K2 second-type candidate deviations, as shown in FIG. 6.

In Embodiment 6, at least one of the K2 second-type candidate deviations is less than each of the K1 first-type candidate deviations.

In one embodiment, the K1 first-type candidate deviations are different from each other.

In one embodiment, the K2 second-type candidate deviations are different from each other.

In one embodiment, the K1 first-type candidate deviations are all non-negative real number(s).

In one embodiment, the K2 second-type candidate deviations are all non-negative real number(s).

In one embodiment, the K1 first-type candidate deviations are all non-negative integer(s).

In one embodiment, the K2 second-type candidate deviations are all non-negative integer(s).

In one embodiment, the K1 first-type candidate deviations are predefined.

In one subembodiment, the K1 is equal to 8, and the K1 first-type candidate deviations are 1, 2, 3, 4, 5, 6, 7 and 8 respectively.

In one embodiment, the K1 first-type candidate deviations are configurable.

In one subembodiment, the K1 first-type candidate deviations are configured by a higher-layer parameter dl-DataToUL-AC, and specific definitions of the dl-DataToUL-AC can refer to Chapter 9.2.3 in 3GPP TS38.213.

In one embodiment, the K2 second-type candidate deviations are predefined.

In one embodiment, the K2 second-type candidate deviations are configurable.

In one embodiment, a minimum value in the K2 second-type candidate deviations is less than a minimum value in the K1 first-type candidate deviations.

In one subembodiment, the minimum value in the K2 second-type candidate deviations is equal to 0, and the minimum value in the K1 first-type candidate deviations is greater than 0.

In one subembodiment, the minimum value in the K2 second-type candidate deviations is greater than 0, and the minimum value in the K1 first-type candidate deviations is greater than 0.

Embodiment 7

Figure 7:
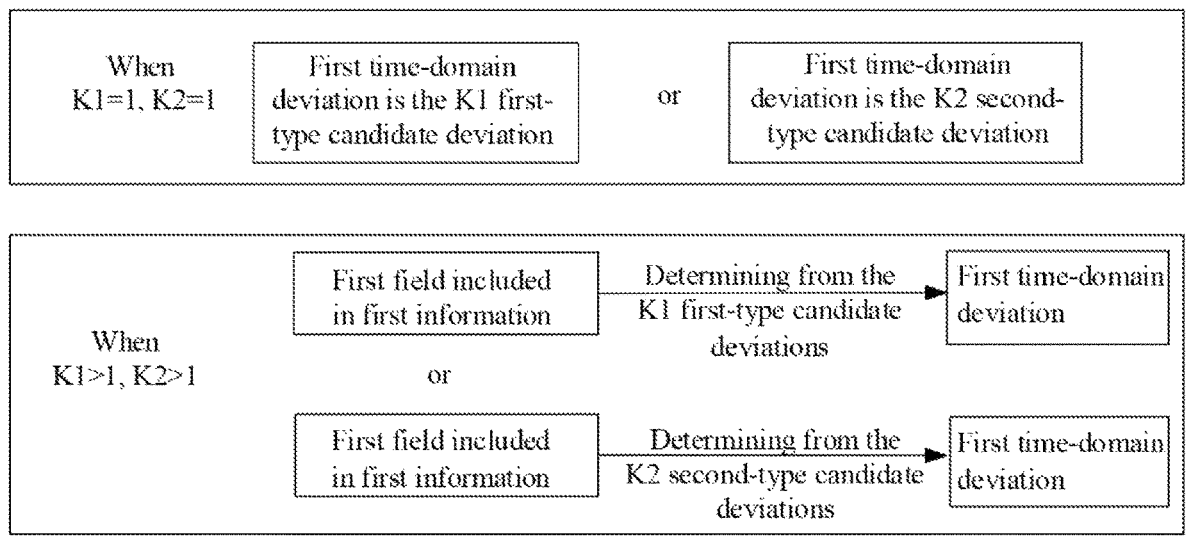
FIG. 7 is a diagram illustrating the determination of a first time-domain deviation according to one embodiment of the disclosure.

Embodiment 7 illustrates an example of a diagram of the determination of a first time-domain deviation, as shown in FIG. 7.

In Embodiment 7, in the disclosure the K1 is equal to 1, the K2 is equal to 1, the first time-domain deviation is the K1 first-type candidate deviation or the K2 second-type candidate deviation in the disclosure; or, the K1 is greater than 1, the K2 is greater than 1, the first signaling in the disclosure carries first information, the first information includes a first field, the first field included in the first information is used for determining the first time-domain deviation from the K1 first-type candidate deviations or the K2 second-type candidate deviations.

In one embodiment, the first field included in the first information includes a positive integer number of bits.

In one embodiment, the first field included in the first information includes a non-negative integer number of bits.

In one embodiment, the first field included in the first information includes J1 bits, wherein the J1 is a non-negative integer, and the J1 is predefined or configurable.

In one subembodiment, the J1 is predefined.

In one subembodiment, the J1 is equal to 3.

In one subembodiment, the J1 is configurable.

In one subembodiment, the J1 takes a value from a range $\{0, 1, 2, 3\}$.

In one subembodiment, the J1 takes a value from a range $\{1, 2, 3\}$.

In one subembodiment, the J1 is equal to $\lceil \log_2(I) \rceil$, where I is a number of entries included in a higher-layer parameter dl-DataToUL-ACK, and specific definitions of the dl-DataToUL-ACK can refer to Chapter 9.2.3 in 3GPP TS38.213.

In one embodiment, the first field included in the first information is a PDSCH-to-HARQ feedback timing indicator, and specific definitions of the PDSCH-to-HARQ_feedback timing indicator can refer to Chapter 9.2.3 in 3GPP TS38.213.

In one embodiment, the first field included in the first information includes J1 bits, wherein the J1 is a non-negative integer, and the K1 or the K2 is used for determining the J1.

In one subembodiment, the first field included in the first information is used for determining the first time-domain deviation from the K1 first-type candidate deviations, and the K1 is used for determining the J1.

In one subembodiment, the first field included in the first information is used for determining the first time-domain deviation from the K1 first-type candidate deviations, and the K1 is used for determining the J1; the J1 is equal to the K1, or the J1 is equal to $\lceil \log_2(K1) \rceil$.

In one subembodiment, the first field included in the first information is used for determining the first time-domain deviation from the K2 second-type candidate deviations, and the K2 is used for determining the J1.

In one subembodiment, the first field included in the first information is used for determining the first time-domain deviation from the K2 second-type candidate deviations, and the K2 is used for determining the J1; the J1 is equal to the K2, or the J1 is equal to $\lceil \log_2(K2) \rceil$.

Embodiment 8

Figure 8:
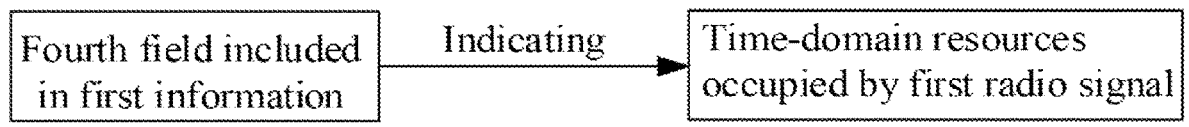
FIG. 8 is a diagram illustrating a case in which a first signaling is used for determining time-domain resources occupied by a first radio signal according to one embodiment of the disclosure.

Embodiment 8 illustrates an example of a diagram of a case in which a first signaling is used for determining time-domain resources occupied by a first radio signal, as shown in FIG. 8.

In Embodiment 8, the first signaling carries first information, the first information includes a fourth field, the fourth field included in the first information includes a positive integer number of bits, and the fourth field included in the first information is used for indicating time-domain resources occupied by the first radio signal.

In one embodiment, the fourth field included in the first information indicates explicitly time-domain resources occupied by the first radio signal.

In one embodiment, the fourth field included in the first information indicates implicitly time-domain resources occupied by the first radio signal.

In one embodiment, the first signaling is used for indicating scheduling information of the first radio signal.

In one embodiment, the first radio signal includes data, and the feedback on the first radio signal includes a HARQ-ACK.

In one embodiment, the scheduling information of the first radio signal includes at least one of occupied time-domain resources, occupied frequency-domain resources, a MCS, configuration information of a DMRS, a HARQ process number, a Redundancy Version (RV), a New Data Indicator (NDI), a transmitting antenna port, corresponding multi-antenna related transmission and corresponding multi-antenna related receiving.

In one subembodiment, the time-domain resources occupied by the first radio signal are the occupied time-domain resources included in the scheduling information of the first radio signal.

In one subembodiment, the configuration information of the DMRS includes at least one of an RS sequence, a mapping mode, a DMRS type, occupied time-domain resources, occupied frequency-domain resources, occupied code-domain resources, a Cyclic Shift (CS) and an Orthogonal Cover Code (OCC).

In one embodiment, the multi-antenna related receiving is spatial Rx parameters.

In one embodiment, the multi-antenna related receiving is a receiving beam.

In one embodiment, the multi-antenna related receiving is a receiving beamforming matrix.

In one embodiment, the multi-antenna related receiving is a receiving analog beamforming matrix.

In one embodiment, the multi-antenna related receiving is a receiving analog beamforming vector.

In one embodiment, the multi-antenna related receiving is a receiving beamforming vector.

In one embodiment, the multi-antenna related receiving is receiving spatial filtering.

In one embodiment, the multi-antenna related transmission is spatial Tx parameters.

In one embodiment, the multi-antenna related transmission is a transmitting beam.

In one embodiment, the multi-antenna related transmission is a transmitting beamforming matrix.

In one embodiment, the multi-antenna related transmission is a transmitting analog beamforming matrix.

In one embodiment, the multi-antenna related transmission is a transmitting analog beamforming vector.

In one embodiment, the multi-antenna related transmission is a transmitting beamforming vector.

In one embodiment, the multi-antenna related transmission is transmitting spatial filtering.

In one embodiment, the spatial Tx parameters include one or more of a transmitting antenna port, a transmitting antenna port group, a transmitting beam, a transmitting analog beamforming matrix, a transmitting analog beamforming vector, a transmitting beamforming matrix, a transmitting beamforming vector, and transmitting spatial filtering.

In one embodiment, the spatial Rx parameters include one or more of a receiving beam, a receiving analog beamforming matrix, a receiving analog beamforming vector, a receiving beamforming matrix, a receiving beamforming vector, and receiving spatial filtering.

In one embodiment, the fourth field included in the first information is Time domain resource assignment, and specific definitions of the Time domain resource assignment can refer to Chapter 5.1.2.1 in 3GPP TS38.214.

In one embodiment, the fourth field included in the first information indicates a second time-domain deviation; a reference time window includes time-domain resources occupied by the first signaling, and the second time-domain deviation is a deviation in time domain between the first time window and the reference time window.

In one embodiment, the fourth field included in the first information indicates a second time-domain deviation, an occupied start multicarrier symbol and a number of occupied multicarrier symbols; a reference time window includes time-domain resources occupied by the first signaling, and the second time-domain deviation is a deviation in time domain between the first time window and the reference time window.

In one subembodiment, the second time-domain deviation is $K_0$, and specific definitions of the $K_0$ can refer to Chapter 5.1.2.1 in 3GPP TS38.214.

In one subembodiment, the occupied start multicarrier symbol and the number of occupied multicarrier symbols indicated by the fourth field included in the first information are SLIV, and specific definitions of the SLIV can refer to Chapter 5.1.2.1 in 3GPP TS38.214.

In one subembodiment, the occupied start multicarrier symbol indicated by the fourth field included in the first information is S, the number of occupied multicarrier symbols indicated by the fourth field included in the first information is L, and specific definitions of the S and the L can refer to Chapter 5.1.2.1 in 3GPP TS38.214.

In one embodiment, the second time-domain deviation, the occupied start multicarrier symbol and the number of occupied multicarrier symbols indicated by the fourth field included in the first information are predefined or configurable.

In one embodiment, the second time-domain deviation, the occupied start multicarrier symbol and the number of occupied multicarrier symbols indicated by the fourth field included in the first information are configured by a higher-layer parameter.

In one embodiment, the second time-domain deviation, the occupied start multicarrier symbol and the number of occupied multicarrier symbols indicated by the fourth field included in the first information are configured by a higher-layer parameter pdsch-AllocationLis, and specific definitions of the pdsch-AllocationLis can refer to Chapter 6.3.2 in TS38.331.

In one embodiment, the first time window is time domain resources that are the second time-domain deviation later than the reference time window in time domain.

In one embodiment, the unit of the second time-domain deviation is a time-domain resource unit.

In one embodiment, the unit of the second time-domain deviation is a multicarrier symbol.

In one embodiment, the unit of the second time-domain deviation is a second.

In one embodiment, the unit of the second time-domain deviation is a millisecond.

In one embodiment, the second time-domain deviation is a non-negative real number.

In one embodiment, the second time-domain deviation is a non-negative integer.

In one embodiment, the reference time window includes a positive integer number of time-domain resource units.

In one embodiment, the reference time window includes one time-domain resource unit.

In one embodiment, the reference time window includes a positive integer number of consecutive multicarrier symbols.

In one embodiment, the reference time window is a continuous period of time.

In one embodiment, a duration of the reference time window is predefined.

In one embodiment, a duration of the reference time window is configurable.

In one embodiment, a duration of the reference time window is configured by a higher-layer signaling.

In one embodiment, a duration of the reference time window is configured by a physical-layer signaling.

In one embodiment, the second time-domain deviation is a deviation in time domain between a start time of the first time window and a start time of the reference time window.

In one embodiment, the second time-domain deviation is a deviation in time domain between an end time of the first time window and an end time of the reference time window.

In one embodiment, a fifth reference time is a time in the first time window, a sixth reference time is a time in the reference time window, and the second time-domain deviation is a deviation in time domain between the fifth reference time and the sixth reference time; the fifth reference time is a time in the first time window other than the start time and the end time, and the sixth reference time is a time in the reference time window other than the start time and the end time.

In one embodiment, the reference time window includes one time-domain resource unit to which time-domain resources occupied by the first signaling belong, the first time window includes one time-domain resource unit to which the time-domain resources occupied by the first radio signal belong, and the second time-domain deviation is a deviation between an index of the time-domain resource unit included in the first time window and an index of the time-domain resource unit included in the reference time window.

Embodiment 9

Figure 9:
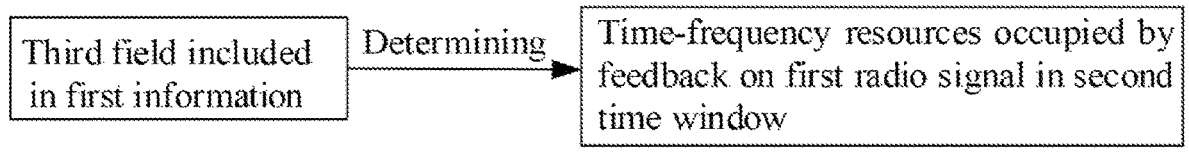
FIG. 9 is a diagram illustrating a case in which a first signaling is used for determining time-frequency resources occupied by a feedback on a first radio signal in a second time window according to one embodiment of the disclosure.

Embodiment 9 illustrates an example of a diagram of a case in which a first signaling is used for determining time-frequency resources occupied by a feedback on a first radio signal in a second time window, as shown in FIG. 9.

In Embodiment 9, the first signaling carries first information, the first information includes a third field, an the third field included in the first information is used for determining time-frequency resources occupied by the feedback on the first radio signal in the second time window.

In one embodiment, the first signaling is used for determining time-frequency resources occupied by the feedback on the first radio signal in the second time window.

In one embodiment, the third field included in the first information includes a positive integer number of bits.

In one embodiment, the third field included in the first information is PUCCH resource indicator, and specific definitions of the PUCCH resource indicator can refer to Chapter 9.2.3 in 3GPP TS38.213.

In one embodiment, the third field included in the first information indicates explicitly time-frequency resources occupied by the feedback on the first radio signal in the second time window.

In one embodiment, the third field included in the first information indicates implicitly time-frequency resources occupied by the feedback on the first radio signal in the second time window.

In one embodiment, the above method further includes: receiving fourth information.

Herein, the fourth information is used for indicating configuration information of J2 candidate time-frequency resource(s), the J2 is a positive integer, the first signaling and the fourth information are used together for determining time-frequency resources occupied by the feedback on the first radio signal in the second time window.

In one subembodiment, the third field included in the first information is used for determining, from the J2 candidate time-frequency resource(s), the time-frequency resources occupied by the feedback on the first radio signal in the second time window.

In one subembodiment, the time-frequency resources occupied by the feedback on the first radio signal in the second time window are one of the J2 candidate time-frequency resource(s).

In one subembodiment, the J2 candidate time-frequency resource(s) is(are) J2 PUCCH resource(s) respectively.

In one subembodiment, the time-frequency resources occupied by the feedback on the first radio signal in the second time window are one of the J2 candidate time-frequency resource(s), and the third field included in the first information indicates an index of the time-frequency resources occupied by the feedback on the first radio signal in the second time window in the J2 candidate time-frequency resource(s).

In one subembodiment, the fourth information is semi-statically configured.

In one subembodiment, the fourth information is carried by a higher-layer signaling.

In one embodiment, the fourth information is carried by an RRC signaling.

In one embodiment, the fourth information includes one or more IEs in one RRC signaling.

In one embodiment, the fourth information includes a part or entirety of one IE in one RRC signaling.

In one embodiment, the fourth information includes more IEs in one RRC signaling.

In one subembodiment, configuration information of each of the J2 candidate time-frequency resource(s) includes at least one of occupied time-domain resources, occupied code-domain resources, occupied frequency-domain resources and a corresponding antenna port group.

In one subembodiment, configuration information of each of the J2 candidate time-frequency resource(s) includes occupied time-domain resources, occupied code-domain resources, occupied frequency-domain resources and a corresponding antenna port group.

In one subembodiment, configuration information of each of the J2 candidate time-frequency resource(s) includes an occupied start multicarrier symbol, a number of occupied multicarrier symbols, an initial Physical Resource Block (PRB) before hopping or without hopping, an initial PRB after hopping, a number of occupied PRBs, a hopping set, a CS, an OCC, an OCC length, a corresponding antenna port group and a maximum code rate.

In one subembodiment, configuration information of each of the J2 candidate time-frequency resource(s) includes at least one of an occupied start multicarrier symbol, a number of occupied multicarrier symbols, an initial PRB before hopping or without hopping, an initial PRB after hopping, a number of occupied PRBs, a hopping set, a CS, an OCC, an OCC length, a corresponding antenna port group and a maximum code rate.

In one embodiment, the UE determines a first candidate time-frequency resource set from J3 candidate time-frequency resource sets, wherein the J3 is a positive integer greater than 1; the first candidate time-frequency resource set is one of the J3 candidate time-frequency resource sets, and the first candidate time-frequency resource set includes J2 candidate time-frequency resource(s).

In one subembodiment, the first candidate time-frequency resource set is determined from the J3 candidate time-frequency resource sets according to a payload size of the feedback on the first radio signal.

In one subembodiment, the J3 candidate time-frequency resource sets correspond to J3 payload size ranges respectively, the payload size of the feedback on the first radio signal belongs to a first payload size range, the first payload size range is one of the J3 payload size ranges, the first candidate time-frequency resource set is one of the J3 candidate time-frequency resource sets corresponding to the first payload size range.

In one subembodiment, the first candidate time-frequency resource set is determined from the J3 candidate time-frequency resource sets according to a number of bits included in the feedback on the first radio signal.

In one subembodiment, the J3 candidate time-frequency resource sets correspond to J3 bit number ranges respectively, the number of bits included in the feedback on the first radio signal belongs to a first bit number range, the first bit number range is one of the J3 bit number ranges, the first candidate time-frequency resource set is one of the J3 candidate time-frequency resource sets corresponding to the first bit number range.

In one subembodiment, the J3 is equal to 4, and the J3 bit number ranges are [1,2], (2,N2], (N2,N3] and (N3,1706] respectively, where the N2 and the N3 are configured by a higher-layer signaling.

In one subembodiment, the J3 is equal to 4, and the J3 bit number ranges are [1,2], (2,N2], (N2,N3] and [N3,1706] respectively, where the N2 and the N3 are configured by a higher-layer signaling.

Embodiment 10

Figure 10:
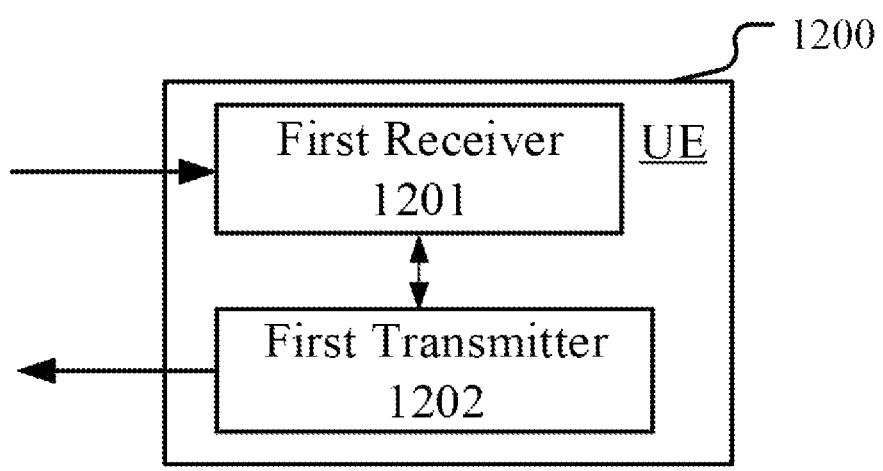
FIG. 10 is a structure block diagram illustrating a processing device in a UE according to one embodiment of the disclosure.

Embodiment 10 illustrates an example of a structure diagram of a processing device in a UE, as shown in FIG. 10. In FIG. 10, the processing device 1200 in the UE includes a first receiver 1201 and a first transmitter 1202.

In one embodiment, the first receiver 1201 includes the receiver 456, the receiving processor 452 and the controller/processor 490 illustrated in Embodiment 4.

In one embodiment, the first receiver 1201 includes at least the former two of the receiver 456, the receiving processor 452 and the controller/processor 490 illustrated in Embodiment 4.

In one embodiment, the first transmitter 1202 includes the transmitter 456, the transmitting processor 455 and the controller/processor 490 illustrated in Embodiment 4.

In one embodiment, the first transmitter 1202 includes at least the former two of the transmitter 456, the transmitting processor 455 and the controller/processor 490 illustrated in Embodiment 4.

The first receiver 1201 is to receive a first signaling and to receive a first radio signal in a first time window.

The first transmitter 1202 is to transmit a feedback on the first radio signal in a second time window.

In Embodiment 10, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, at least one of the K2 second-type candidate deviation(s) is less than each of the K1 first-type candidate deviation(s).

In one embodiment, the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, and the first field included in the first information is used for determining the first time-domain deviation from the K1 first-type candidate deviations or the K2 second-type candidate deviations.

In one embodiment, the first signaling is used for determining time-frequency resources occupied by the feedback on the first radio signal in the second time window.

In one embodiment, the first receiver 1201 further receives second information; wherein the second information is used for indicating at least one of the K1 first-type candidate deviation(s) and the K2 second-type candidate deviation(s).

In one embodiment, the first receiver 1201 further receives third information; wherein the third information is used for indicating the second identifier.

Embodiment 11

Figure 11:
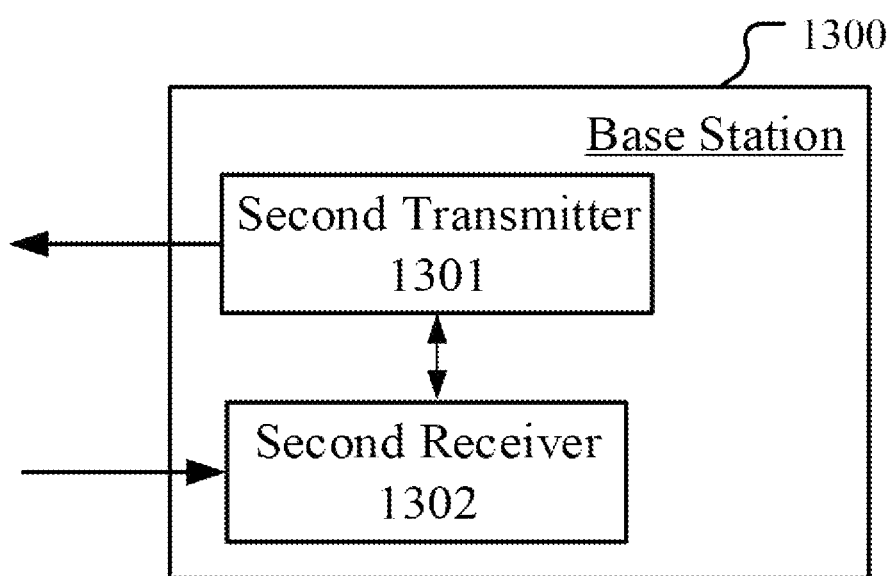
FIG. 11 is a structure block diagram illustrating a processing device in a base station according to one embodiment of the disclosure.

Embodiment 11 illustrates an example of a structure diagram of a processing device in a base station, as shown in FIG. 11. In FIG. 11, the processing device 1300 in the base station includes a second transmitter 1301 and a second receiver 1302.

In one embodiment, the second transmitter 1301 includes the transmitter 416, the transmitting processor 415 and the controller/processor 440 illustrated in Embodiment 4.

In one embodiment, the second transmitter 1301 includes at least the former two of the transmitter 416, the transmitting processor 415 and the controller/processor 440 illustrated in Embodiment 4.

In one embodiment, the second receiver 1302 includes the receiver 416, the receiving processor 412 and the controller/processor 440 illustrated in Embodiment 4.

In one embodiment, the second receiver 1302 includes at least the former two of the receiver 416, the receiving processor 412 and the controller/processor 440 illustrated in Embodiment 4.

The second transmitter 1301 is to transmit a first signaling and to transmit a first radio signal in a first time window.

The second receiver 1302 is to receive a feedback on the first radio signal in a second time window.

In Embodiment 11, the first signaling is used for determining time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, and at least one of the K2 second-type candidate deviation(s) is different from all of the K1 first-type candidate deviation(s).

In one embodiment, at least one of the K2 second-type candidate deviation(s) is less than each of the K1 first-type candidate deviation(s).

In one embodiment, the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information includes a first field, the first field included in the first information is used for determining the first time-domain deviation from the K1 first-type candidate deviations or the K2 second-type candidate deviations.

In one embodiment, the first signaling is used for determining time-frequency resources occupied by the feedback on the first radio signal in the second time window.

In one embodiment, the second transmitter 1301 further transmits second information; wherein the second information is used for indicating at least one of the K1 first-type candidate deviation(s) and the K2 second-type candidate deviation(s).

In one embodiment, the second transmitter 1301 further transmits third information; wherein the third information is used for indicating the second identifier.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:

receiving a first signaling, wherein the first signaling is a DCI signaling, the first signaling carries first information, and the first information includes one DCI;

receiving a first radio signal in a first time window, wherein the first radio signal is transmitted on a PDSCH; and transmitting a feedback on the first radio signal in a second time window, wherein a transport channel of the feedback on the first radio signal is a PUCCH; the first information includes a third field, the third field included in the first information is PUCCH resource indicator, and the third field included in the first information is used for determining time-frequency resources occupied by the feedback on the first radio signal in the second time window;

wherein the first signaling is used for determining time-domain resources occupied by the first radio signal, the first information includes a fourth field, the fourth field included in the first information includes a positive integer number of bits, and the fourth field included in the first information is used for indicating time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, the first identifier and the second identifier are two different non-negative integers respectively and at least one of the K2 second-type candidate deviation(s) is different from all of the K1 first-type candidate deviation(s); the K1 first-type candidate deviations are all non-negative integer(s), the K2 second-type candidate deviations are all non-negative integer(s), or, the K1 first-type candidate deviations are all non-negative real number(s), the K2 second-type candidate deviations are all non-negative real number(s).

2. The method according to claim 1, wherein the first time window includes one or more time-domain resource units to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot;

or, the first time window includes one time-domain resource unit to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot; the first time-domain deviation is a deviation between an index of the time-domain resource unit included in the second time window and an index of the time-domain resource unit included in the first time window; the unit of the first time-domain deviation is the time-domain resource unit and the first time-domain deviation is a non-negative integer.

3. The method according to claim 1, wherein the first time-domain deviation is a non-negative real number, the unit of the first time-domain deviation is a millisecond; or, the first time-domain deviation is a deviation in time domain between an end time of the second time window and an end time of the first time window.

4. The method according to claim 1, wherein at least one of the K2 second-type candidate deviation(s) is less than each of the K1 first-type candidate deviation(s), or, the minimum value in the K2 second-type candidate deviations is equal to 0 and the minimum value in the K1 first-type candidate deviations is greater than 0;
   or, the K1 is equal to 1, the K2 is equal to 1, the first time-domain deviation is the K1 first-type candidate deviation or the K2 second-type candidate deviation;
   or, the K1 is greater than 1, the K2 is greater than 1, the first signaling carries first information, the first information comprises a first field, the first field included in the first information is PDSCH-to-HARQ_feedback timing indicator, the first field comprised in the first information is used for determining the first time-domain deviation from the K1 first-type candidate deviations or the K2 second-type candidate deviations.

5. The method according to claim 1, wherein the first identifier and the second identifier are two different RNTIs respectively, a Cyclic Redundancy Check (CRC) bit sequence of the first signaling is scrambled by the first identifier or the second identifier;
   or, receiving third information; wherein the third information includes one or more IEs in one RRC signaling; the third information is used for indicating the second identifier or the third information is used for indicating the first identifier and the second identifier.

6. The method according to claim 1, wherein the K1 is equal to 8, and the K1 first-type candidate deviations are 1, 2, 3, 4, 5, 6, 7 and 8 respectively, the K2 second-type candidate deviations are configurable, or, the K1 first-type candidate deviations are configurable, the K2 second-type candidate deviations are configurable;
   or, comprising: receiving second information; wherein the second information includes one or more IEs in one RRC signaling; the second information is used for indicating at least one of the K1 first-type candidate deviation(s) and the K2 second-type candidate deviation(s).

7. A method in a base station for wireless communication, comprising:
   transmitting a first signaling, wherein the first signaling is a DCI signaling, the first signaling carries first information, and the first information includes one DCI;
   transmitting a first radio signal in a first time window, wherein the first radio signal is transmitted on a PDSCH; and
   receiving a feedback on the first radio signal in a second time window, wherein a transport channel of the feedback on the first radio signal is a PUCCH; the first information includes a third field, the third field included in the first information is PUCCH resource indicator, and the third field included in the first information is used for determining time-frequency resources occupied by the feedback on the first radio signal in the second time window;
   wherein the first signaling is used for determining time-domain resources occupied by the first radio signal, the first information includes a fourth field, the fourth field included in the first information includes a positive integer number of bits, and the fourth field included in the first information is used for indicating time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, the first identifier and the second identifier are two different non-negative integers respectively and at least one of the K2 second-type candidate deviation(s) is different from all of the K1 first-type candidate deviation(s); the K1 first-type candidate deviations are all non-negative integer(s), the K2 second-type candidate deviations are all non-negative integer(s), or, the K1 first-type candidate deviations are all non-negative real number(s), the K2 second-type candidate deviations are all non-negative real number(s).

8. The method according to claim 7, wherein the first time window includes one or more time-domain resource units to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot;
   or, the first time window includes one time-domain resource unit to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot; the first time-domain deviation is a deviation between an index of the time-domain resource unit included in the second time window and an index of the time-domain resource unit included in the first time window; the unit of the first time-domain deviation is the time-domain resource unit and the first time-domain deviation is a non-negative integer;
   or, the first time-domain deviation is a non-negative real number, the unit of the first time-domain deviation is a millisecond; or, the first time-domain deviation is a deviation in time domain between an end time of the second time window and an end time of the first time window.

9. The method according to claim 7, wherein at least one of the K2 second-type candidate deviation(s) is less than each of the K1 first-type candidate deviation(s), or, the minimum value in the K2 second-type candidate deviations is equal to 0 and the minimum value in the K1 first-type candidate deviations is greater than 0;
  or, the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information comprises a first field, the first field included in the first information is PDSCH-to-HARQ_feedback timing indicator, the first field comprised in the first information is used for determining the first time-domain deviation from the K1 first-type candidate deviations or the K2 second-type candidate deviations.

10. The method according to claim 7, wherein the first identifier and the second identifier are two different RNTIs respectively, a Cyclic Redundancy Check (CRC) bit sequence of the first signaling is scrambled by the first identifier or the second identifier;
  or, comprising: transmitting third information; wherein the third information includes one or more IEs in one RRC signaling; the third information is used for indicating the second identifier or the third information is used for indicating the first identifier and the second identifier;
  or, the K1 is equal to 8, and the K1 first-type candidate deviations are 1, 2, 3, 4, 5, 6, 7 and 8 respectively, the K2 second-type candidate deviations are configurable, or, the K1 first-type candidate deviations are configurable, the K2 second-type candidate deviations are configurable;
  or, comprising: transmitting second information; wherein the second information includes one or more IEs in one RRC signaling; the second information is used for indicating at least one of the K1 first-type candidate deviation(s) and the K2 second-type candidate deviation(s).

11. A UE for wireless communication, comprising:
a first receiver, to receive a first signaling, and to receive a first radio signal in a first time window; wherein the first signaling is a DCI signaling, the first signaling carries first information, the first information includes one DCI, and the first radio signal is transmitted on a PDSCH; and
a first transmitter, to transmit a feedback on the first radio signal in a second time window; wherein a transport channel of the feedback on the first radio signal is a PUCCH; the first information includes a third field, the third field included in the first information is PUCCH resource indicator, and the third field included in the first information is used for determining time-frequency resources occupied by the feedback on the first radio signal in the second time window;
wherein the first signaling is used for determining time-domain resources occupied by the first radio signal, the first information includes a fourth field, the fourth field included in the first information includes a positive integer number of bits, and the fourth field included in the first information is used for indicating time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, the first identifier and the second identifier are two different non-negative integers respectively and at least one of the K2 second-type candidate deviation(s) is different from all of the K1 first-type candidate deviation(s); the K1 first-type candidate deviations are all non-negative integer(s), the K2 second-type candidate deviations are all non-negative integer(s), or, the K1 first-type candidate deviations are all non-negative real number(s), the K2 second-type candidate deviations are all non-negative real number(s).

12. The UE according to claim 11, wherein the first time window includes one or more time-domain resource units to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot;
  or, the first time window includes one time-domain resource unit to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot; the first time-domain deviation is a deviation between an index of the time-domain resource unit included in the second time window and an index of the time-domain resource unit included in the first time window; the unit of the first time-domain deviation is the time-domain resource unit and the first time-domain deviation is a non-negative integer.

13. The UE according to claim 11, wherein the first time-domain deviation is a non-negative real number, the unit of the first time-domain deviation is a millisecond; or, the first time-domain deviation is a deviation in time domain between an end time of the second time window and an end time of the first time window.

14. The UE according to claim 11, wherein at least one of the K2 second-type candidate deviation(s) is less than each of the K1 first-type candidate deviation(s), or, the minimum value in the K2 second-type candidate deviations is equal to 0 and the minimum value in the K1 first-type candidate deviations is greater than 0;
  or, the K1 is equal to 1, the K2 is equal to 1, the first time-domain deviation is the K1 first-type candidate deviation or the K2 second-type candidate deviation; or, the K1 is greater than 1, the K2 is greater than 1, the first signaling carries first information, the first information comprises a first field, the first field included in the first information is PDSCH-to-HARQ_feedback timing indicator, the first field comprised in the first information is used for determining the first time-domain deviation from the K1 first-type candidate deviations or the K2 second-type candidate deviations.

15. The UE according to claim 11, wherein the first identifier and the second identifier are two different RNTIs respectively, a Cyclic Redundancy Check (CRC) bit sequence of the first signaling is scrambled by the first identifier or the second identifier;
  or, the first receiver further receives third information; wherein the third information includes one or more IEs in one RRC signaling; the third information is used for indicating the second identifier or the third information is used for indicating the first identifier and the second identifier.

16. The UE according to claim 11, wherein the K1 is equal to 8, and the K1 first-type candidate deviations are 1, 2, 3, 4, 5, 6, 7 and 8 respectively, the K2 second-type candidate deviations are configurable, or, the K1 first-type candidate deviations are configurable, the K2 second-type candidate deviations are configurable;

or, the first receiver further receives second information; wherein the second information includes one or more IEs in one RRC signaling; the second information is used for indicating at least one of the K1 first-type candidate deviation(s) and the K2 second-type candidate deviation(s).

17. A base station for wireless communication, comprising:

a second transmitter, to transmit a first signaling, and to transmit a first radio signal in a first time window; wherein the first signaling is a DCI signaling, the first signaling carries first information, the first information includes one DCI, and the first radio signal is transmitted on a PDSCH; and a second receiver, to receive a feedback on the first radio signal in a second time window, wherein a transport channel of the feedback on the first radio signal is a PUCCH; the first information includes a third field, the third field included in the first information is PUCCH resource indicator, and the third field included in the first information is used for determining time-frequency resources occupied by the feedback on the first radio signal in the second time window;

wherein the first signaling is used for determining time-domain resources occupied by the first radio signal, the first information includes a fourth field, the fourth field included in the first information includes a positive integer number of bits, and the fourth field included in the first information is used for indicating time-domain resources occupied by the first radio signal; a first time-domain deviation is a deviation in time domain between the second time window and the first time window; when the first signaling carries a first identifier, the first time-domain deviation is one of K1 first-type candidate deviation(s), and K1 is a positive integer; when the first signaling carries a second identifier, the first time-domain deviation is one of K2 second-type candidate deviation(s), and K2 is a positive integer; the first identifier is different from the second identifier, the first identifier and the second identifier are two different non-negative integers respectively and at least one of the K2 second-type candidate deviation(s) is different from all of the K1 first-type candidate deviation(s); the K1 first-type candidate deviations are all non-negative integer(s), the K2 second-type candidate deviations are all non-negative integer(s), or, the K1 first-type candidate deviations are all non-negative real number(s), the K2 second-type candidate deviations are all non-negative real number(s).

18. The base station according to claim 17, wherein the first time window includes one or more time-domain resource units to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot;

or, the first time window includes one time-domain resource unit to which the time-domain resources occupied by the first radio signal belong, and the second time window includes one time-domain resource unit to which the time-domain resources occupied by the feedback on the first radio signal belong; the time-domain resource unit includes a positive integer number of consecutive multicarrier symbols, or the time-domain resource unit includes one slot; the first time-domain deviation is a deviation between an index of the time-domain resource unit included in the second time window and an index of the time-domain resource unit included in the first time window; the unit of the first time-domain deviation is the time-domain resource unit and the first time-domain deviation is a non-negative integer;

or, the first time-domain deviation is a non-negative real number, the unit of the first time-domain deviation is a millisecond; or, the first time-domain deviation is a deviation in time domain between an end time of the second time window and an end time of the first time window.

19. The base station according to claim 17, wherein at least one of the K2 second-type candidate deviation(s) is less than each of the K1 first-type candidate deviation(s), or, the minimum value in the K2 second-type candidate deviations is equal to 0 and the minimum value in the K1 first-type candidate deviations is greater than 0;

or, the K1 is equal to 1, the K2 is equal to 1, the first time-domain deviation is the K1 first-type candidate deviation or the K2 second-type candidate deviation;

or, the K1 is greater than 1, the K2 is greater than 1, the first signaling carries first information, the first information comprises a first field, the first field included in the first information is PDSCH-to-HARQ_feedback timing indicator, the first field comprised in the first information is used for determining the first time-domain deviation from the K1 first-type candidate deviations or the K2 second-type candidate deviations.

20. The base station according to claim 17, wherein the first identifier and the second identifier are two different RNTIs respectively, a Cyclic Redundancy Check (CRC) bit sequence of the first signaling is scrambled by the first identifier or the second identifier;

or, the second transmitter further transmits third information; wherein the third information includes one or more IEs in one RRC signaling; the third information is used for indicating the second identifier or the third information is used for indicating the first identifier and the second identifier;

or, the K1 is equal to 8, and the K1 first-type candidate deviations are 1, 2, 3, 4, 5, 6, 7 and 8 respectively, the K2 second-type candidate deviations are configurable, or, the K1 first-type candidate deviations are configurable, the K2 second-type candidate deviations are configurable;

or, the second transmitter further transmits second information; wherein the second information includes one or more IEs in one RRC signaling; the second information is used for indicating at least one of the K1 first-type candidate deviation(s) and the K2 second-type candidate deviation(s).

* * * * *